US011675978B2

(12) United States Patent
Yuan et al.

(10) Patent No.: US 11,675,978 B2
(45) Date of Patent: Jun. 13, 2023

(54) ENTITY RECOGNITION BASED ON MULTI-TASK LEARNING AND SELF-CONSISTENT VERIFICATION

(71) Applicant: INTERNATIONAL BUSINESS MACHINES CORPORATION, Armonk, NY (US)

(72) Inventors: Zhong Fang Yuan, Xian (CN); Tong Liu, Xian (CN); Bin Shang, Xi'an (CN); Chen Yu Chang, Xi'an (CN); Na Liu, Xi'An (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/248,030

(22) Filed: Jan. 6, 2021

(65) Prior Publication Data

US 2022/0215173 A1 Jul. 7, 2022

(51) Int. Cl.
*G06F 40/295* (2020.01)
*G06F 40/166* (2020.01)

(52) U.S. Cl.
CPC .......... *G06F 40/295* (2020.01); *G06F 40/166* (2020.01)

(58) Field of Classification Search
None
See application file for complete search history.

(56) References Cited

U.S. PATENT DOCUMENTS 7,299,180 B2* 11/2007 Wang .................... G06F 40/295
                                                                              704/255
9,235,567 B2* 1/2016 Mylonakis .............. G06F 40/44
(Continued)

FOREIGN PATENT DOCUMENTS

CN      104899304 A    9/2015
CN      110705294 A    1/2020
(Continued)

OTHER PUBLICATIONS

Giuliano, Claudio et al. "Instance-Based Ontology Population Exploiting Named-Entity Substitution" (pp. 265-272) <https://aclanthology.org/C08-1034.pdf> (Year: 2008).*

(Continued)

*Primary Examiner* — Kavita Stanley
*Assistant Examiner* — Tyler Schallhorn
(74) *Attorney, Agent, or Firm* — Schmeiser, Olsen & Watts, LLP; Christopher Pignato (57) ABSTRACT

An approach is provided for improving a named entity recognition. Using a multi-label classification in a neural network, a sub-entity is identified in an original sentence. First and second labels are determined indicating first and second candidate types of the sub-entity. First and second replacement sentences are generated. The first replacement sentence replaces the sub-entity in the original sentence with a first sub-entity of the first candidate type. The second replacement sentence replaces the sub-entity in the original sentence with a second sub-entity of the second candidate type. First and second confidence scores for the first and second replacement sentences are determined. Based on the first confidence score exceeding the second confidence score by more than a threshold amount, the neural network is retrained by selecting the first instead of the second candidate type as the sub-entity type.

16 Claims, 7 Drawing Sheets

(56) References Cited

U.S. PATENT DOCUMENTS

| | | | |
|---|---|---|---|
| 10,679,428 B1* | 6/2020 | Chen | G06V 10/255 |
| 10,977,573 B1* | 4/2021 | Dalton | G06F 16/951 |
| 2004/0111264 A1* | 6/2004 | Wang | G06F 40/295 |
| | | | 704/257 |
| 2008/0306728 A1* | 12/2008 | Kamatani | G06F 40/55 |
| | | | 704/7 |
| 2011/0087627 A1* | 4/2011 | Schmid | G06N 3/0454 |
| | | | 706/21 |
| 2014/0200878 A1* | 7/2014 | Mylonakis | G06F 40/51 |
| | | | 704/4 |
| 2015/0019460 A1* | 1/2015 | Simard | G06F 3/0482 |
| | | | 706/11 |
| 2016/0335341 A1* | 11/2016 | Krauss | G06F 16/367 |
| 2019/0042560 A1 | 2/2019 | Kakirwar | |
| 2020/0073933 A1 | 3/2020 | Zhao | |
| 2021/0004693 A1* | 1/2021 | Joglekar | G06N 3/084 |
| 2021/0056169 A1* | 2/2021 | Bahirwani | G06F 40/295 |
| 2022/0188521 A1* | 6/2022 | Mu | G06F 40/166 |

FOREIGN PATENT DOCUMENTS

| | | |
|---|---|---|
| CN | 110738055 A | 1/2020 |
| CN | 111091002 A | 5/2020 |
| CN | 111324696 A | 6/2020 |

OTHER PUBLICATIONS

Zeng, Xiangji et al. "Counterfactual Generator: A Weakly-Supervised Method for Named Entity Recognition" (pp. 7270-7280) <https://aclanthology.org/2020.emnlp-main.590/> (Year: 2020).*

* cited by examiner

ENTITY RECOGNITION BASED ON MULTI-TASK LEARNING AND SELF-CONSISTENT VERIFICATION

BACKGROUND

The present invention relates to information extraction, and more particularly to named entity recognition.

Entity recognition technology is applied in a business scenario as a subtask of information extraction to locate, classify, and highlight important words or phrases in unstructured text, such names of people, organizations, locations, title, etc. Entity recognition includes identifying named entities with nested structures (i.e., nested entities). Nested entities are named entities containing references to other named entities, as in [University of [Hawaii]], in which both [Hawaii] and [University of Hawaii] are named entities. The entities nested inside of other entities are also called sub-entities.

SUMMARY

In one embodiment, the present invention provides a computer-implemented method. The method includes using a multi-label classification in a neural network, identifying, by one or more processors, a candidate sub-entity in an original sentence in a text. The method further includes determining, by the one or more processors, first and second labels as indicating first and second candidate types, respectively, of the identified candidate sub-entity. The first and second candidate types are different types. The method further includes generating, by the one or more processors, a first replacement sentence by replacing the candidate sub-entity in the original sentence with a first sub-entity having a type that matches the first candidate type. The method further includes using a translation model, determining, by the one or more processors, a first confidence score for the first replacement sentence. The method further includes generating, by the one or more processors, a second replacement sentence by replacing the candidate sub-entity in the original sentence with a second sub-entity having a type that matches the second candidate type. The method further includes using the translation model, determining, by the one or more processors, a second confidence score for the second replacement sentence. The method further includes determining, by the one or more processors, that the first confidence score exceeds the second confidence score by a first amount that exceeds a threshold amount. The method further includes based on the first confidence score exceeding the second confidence score by the first amount that exceeds the threshold amount, retraining, by the one or more processors, the neural network by selecting the first candidate type instead of the second candidate type as a type of the candidate sub-entity.

A computer program product and a computer system corresponding to the above-summarized method are also described and claimed herein.

DETAILED DESCRIPTION

Overview

Existing entity recognition approaches attempt to accurately identify sub-entities within nested entities. Traditional processing methods for nested entity recognition require multiple classification methods during training, and therefore have poor mobility (i.e., lose context information when performing entity recognition). Furthermore, traditional nested entity recognition approaches often screen out some sub-entities for recognition that are inconsistent with contextual information or the actual scene, and therefore are unable to output useful information in a real business scenario.

Embodiments of the present invention address the aforementioned unique challenges of the traditional entity recognition approaches by providing an entity recognition approach based on multi-task learning and self-consistent verification, which filters sub-entities according to the real scene and outputs a useful information part in a real business scenario.

In one embodiment, a nested named entity recognition (NER) model algorithm is trained in a multi-label way. In the training process of the nested NER model algorithm, an embodiment of the present invention adopts joint context verbs or predicates to carry out "logical or inconsistent" task training. Further, in the training process of the nested NER model algorithm, an embodiment of the present invention uses replacement entities, where the types of the replacement entities are the same as the types indicated by multiple labels of the entity being replaced. In one embodiment, the nested NER model algorithm introduces a translation model for confidence verification to constrain the generated entities.

Figure 1:
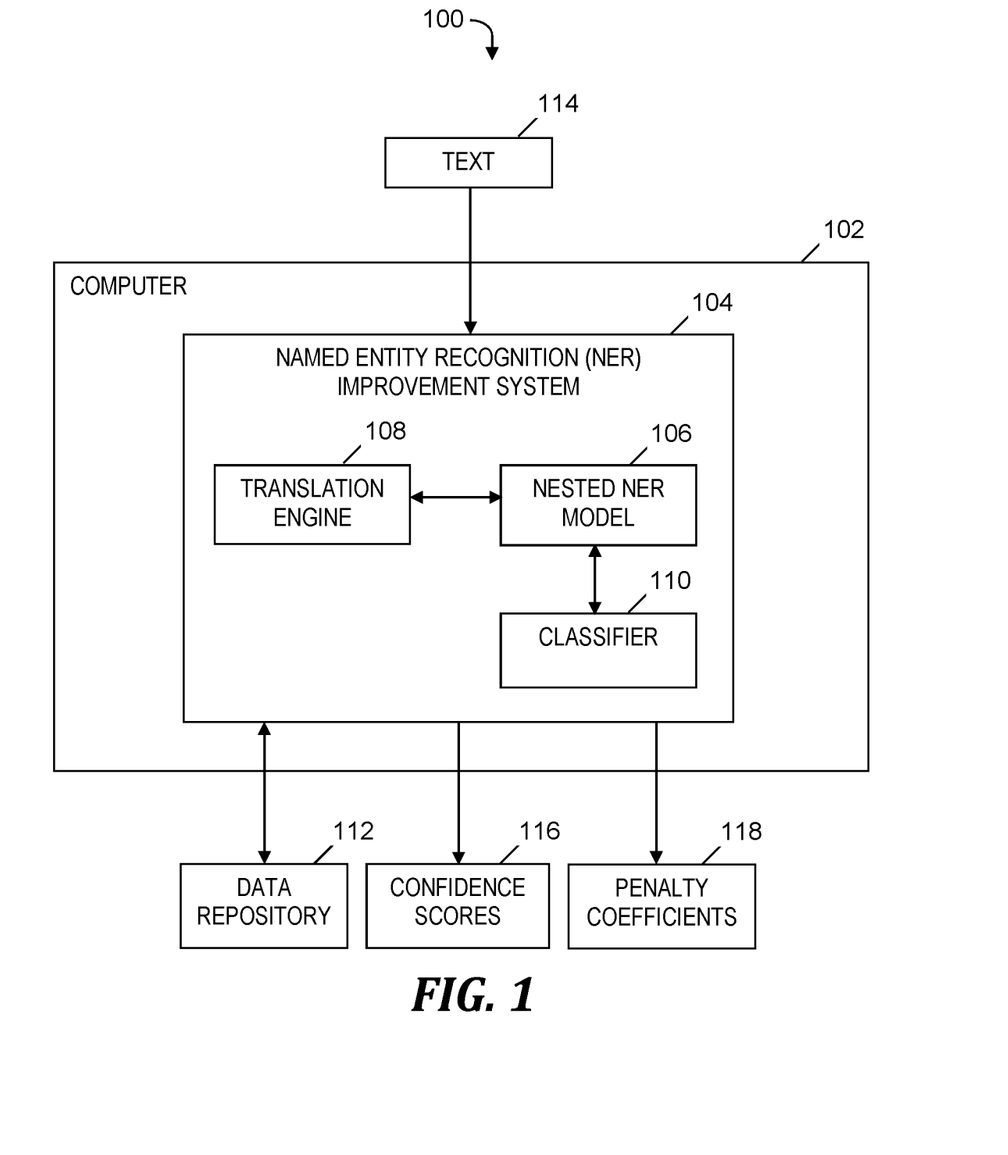
FIG. 1 is a block diagram of a system for improving named entity recognition, in accordance with embodiments of the present invention.

System for Entity Recognition Based on Multi-Task Learning and Self-Consistent Verification FIG. 1 is a block diagram of a system 100 for improving named entity recognition, in accordance with embodiments of the present invention. System 100 includes a computer 102 that includes a software-based NER improvement system 104, which includes a nested NER model 106, a translation engine 108, and a classifier 110. NER improvement system 104 is operatively coupled to a data repository 112.

NER improvement system 104 uses multi-task learning to train nested NER model 106. In one embodiment, the multi-task learning includes multi-label classification of sub-entities. During the training of nested NER model 106, NER improvement system 104 receives text 114 (i.e., unstructured text), identifies sentences within text 114, and identifies sub-entities within the sentences. During the training of nested NER model 106, NER improvement system 104 determines contexts of the identified sentences by identifying a predicate or verb of a given sentence and combining the predicate or verb with a sub-entity identified in the given sentence to form a positive sample or a negative sample as training data for classifier 110. After being trained, classifier 110 determines whether a combination of a given sub-entity and a given predicate or verb is logical based on the type of the sub-entity.

During the aforementioned training of nested NER model 106, NER improvement system 104 identifies sub-entities in the sentences in text 114, where each of the identified sub-entities has multiple labels from the multi-label classification and therefore have multiple candidate types. For a given identified sub-entity in a sentence in text 114, NER improvement system 104 finds sub-entities in a corpus stored in data repository 114 that have the same types as the given identified sub-entity and randomly selects from those sub-entities found in the corpus until the types of the randomly selected sub-entities match the candidate types of the given identified sub-entity. NER improvement system 104 replaces the given identified sub-entity in the sentence with the randomly selected sub-entities to create replacement sentences. NER improvement system 104 sends the replacement sentences to translation engine 108, which calculates respective confidence scores 116 for the replacement sentences. Each of confidence scores 116 indicates an estimate of the confidence of the degree of fluency of a corresponding replacement sentence by using a translation algorithm. NER improvement system 104 calculates penalty coefficients 118 from the respective confidence scores 116. To calculate a given penalty coefficient included in penalty coefficients 118, NER improvement system 104 multiplies a reciprocal of the respective confidence score by a loss value of the artificial neural network that includes nested NER model 106. In one embodiment, the artificial neural network is a long short-term memory (LSTM) network and the loss value is calculated by a LSTM loss function.

The functionality of the components shown in FIG. 1 is described in more detail in the discussion of FIGS. 2A-2B, FIG. 3, FIG. 4, FIG. 5, and FIG. 6 presented below.

Figure 2A:
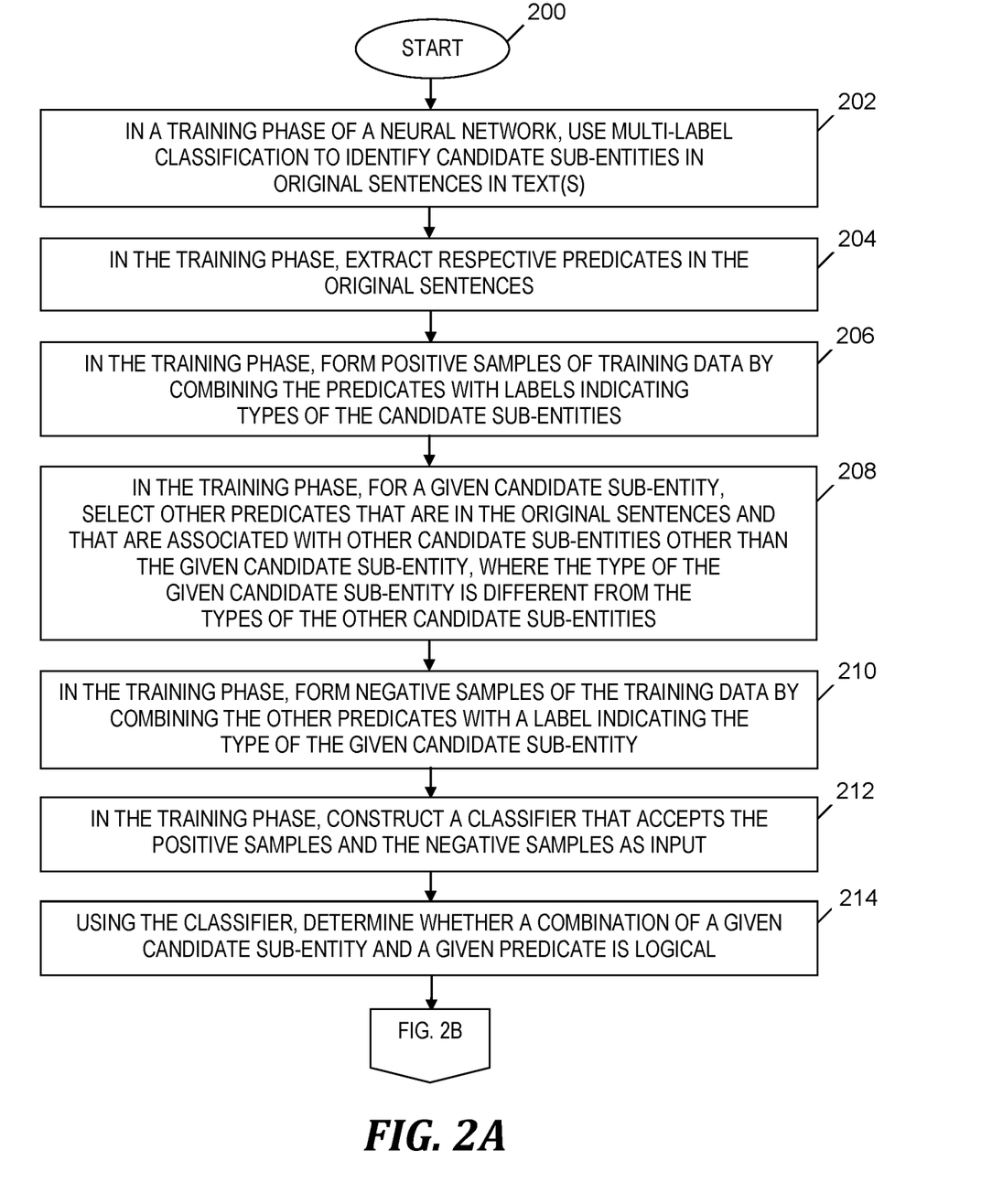
FIGS. 2A-2B depicts a flowchart of a process of improving named entity recognition, where the process is implemented in the system of FIG. 1, in accordance with embodiments of the present invention.
Figure 2B:
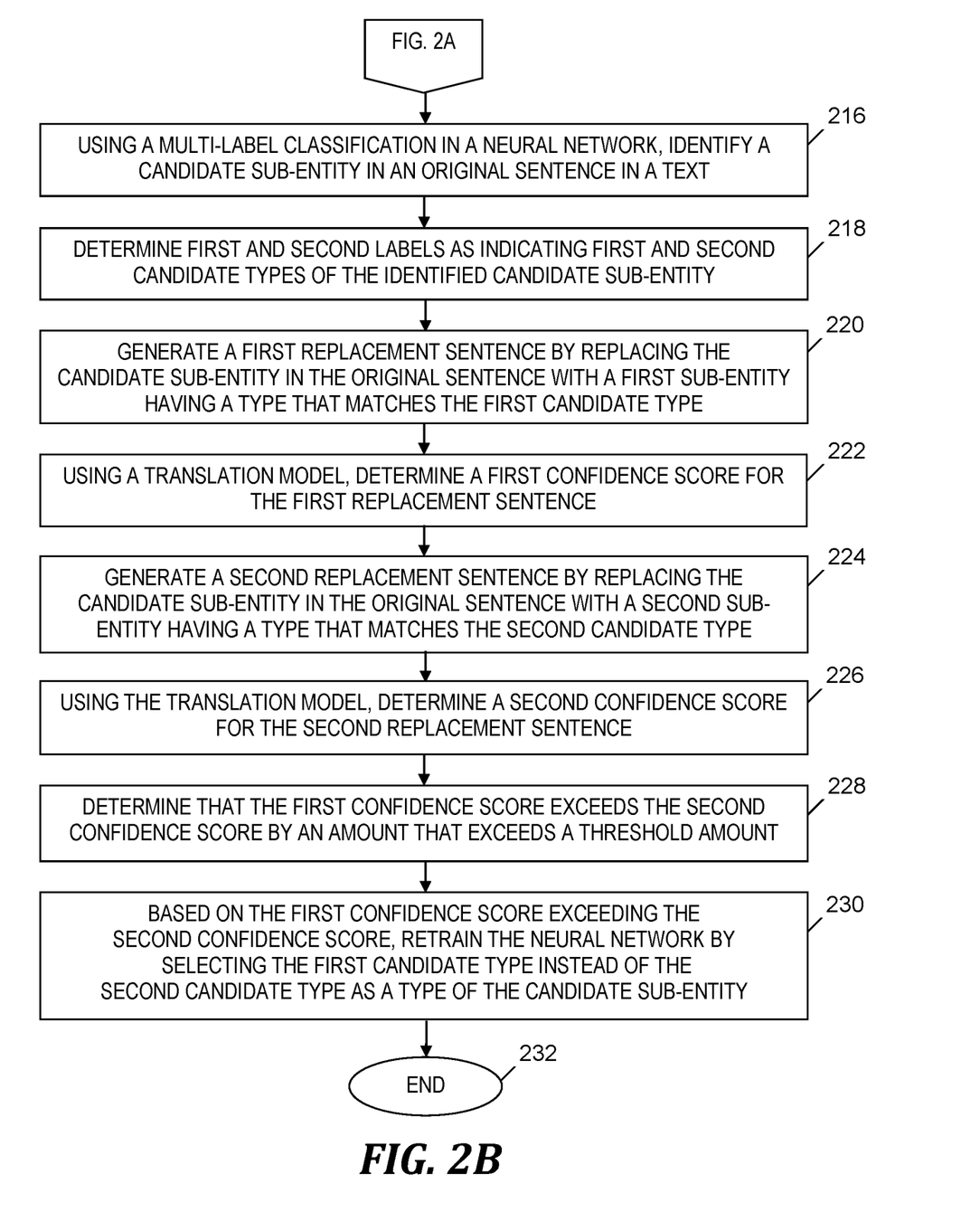

Process for Entity Recognition Based on Multi-Task Learning and Self-Consistent Verification FIGS. 2A-2B depicts a flowchart of a process of improving named entity recognition, where the process is implemented in the system of FIG. 1, in accordance with embodiments of the present invention. The process of FIGS. 2A-2B begins at a start node 200 in FIG. 2A. In step 202, in a training phase of an artificial neural network (e.g., LSTM neural network) (also referred to herein as simply "neural network"), NER improvement system 104 (see FIG. 1) identifies candidate sub-entities in original sentences in text 114 (see FIG. 1) by using multi-task learning. In one embodiment, the multi-task learning includes multi-label classification.

In step 204, in the training phase of the neural network, NER improvement system 104 (see FIG. 1) extracts respective predicates in the original sentences.

In step 206, in the training phase of the neural network, NER improvement system 104 (see FIG. 1) forms positive samples of training data for training nested NER model 106 (see FIG. 1) by combining the predicates extracted in step 204 with labels indicating types of the candidate sub-entities identified in step 202.

In step 208, in the training phase of the neural network, for a given candidate sub-entity included in the candidate sub-entities identified in step 202, NER improvement system 104 (see FIG. 1) selects other predicates (i.e., other than the predicate associated with the given candidate sub-entity) that are in the original sentences and that are associated with other candidate sub-entities (i.e., other than the given candidate sub-entity). The type of the given candidate sub-entity is different from the types of the other candidate sub-entities. Step 208 is repeated for all other candidate sub-entities identified in step 202.

In step 210, in the training phase of the neural network, NER improvement system 104 (see FIG. 1) forms negative samples of the training data by combining the aforementioned other predicates with a label indicating the type of the given candidate sub-entity.

In step 212, in the training phase of the neural network, NER improvement system 104 (see FIG. 1) constructs a classifier that accepts as input the positive samples formed in step 206 and the negative samples formed in step 210 to determine context logic of a given predicate and a given sub-entity in a sentence.

In step 214, using classifier 110 (see FIG. 1), NER improvement system 104 (see FIG. 1) determines whether a combination of a given candidate sub-entity and a given predicate is logical.

In one embodiment, without additional labeling data, NER improvement system 100 includes an auxiliary discriminator that helps improve the accuracy of the nested NER model algorithm.

In one embodiment, after step 214, the process of FIGS. 2A-2B continues with step 216 in FIG. 2B. Alternatively, the steps in FIG. 2B are performed independently of the steps in FIG. 2A.

In step 216 in FIG. 2B, using a multi-label classification in the neural network (or using another multi-task learning technique), NER improvement system 104 (see FIG. 1) identifies a candidate sub-entity in an original sentence in text 114 (see FIG. 1).

In step 218, NER improvement system 104 (see FIG. 1) determines first and second labels as indicating respective first and second candidate types of the candidate sub-entity identified in step 216.

In step 220, NER improvement system 104 (see FIG. 1) generates a first replacement sentence by replacing the candidate sub-entity in the original sentence with a first sub-entity having a type that matches the first candidate type indicated by the first label determined in step 218.

In one embodiment, prior to step 220, NER improvement system 104 (see FIG. 1) retrieves from the corpus stored in data repository 112 (see FIG. 1) first additional sub-entities having labels indicating a type that matches the first candidate type referenced in step 220. NER improvement system 104 (see FIG. 1) randomly selects the first sub-entity referenced in step 220 from the retrieved first additional sub-entities. The random selection of the first sub-entity employs a pseudo-random number generator or a hardware random number generator.

In step 222, using a translation model included in translation engine 108 (see FIG. 1), NER improvement system 104 (see FIG. 1) determines a first confidence score for the first replacement sentence. The first confidence score is included in confidence scores 116 (see FIG. 1).

In one embodiment, after step 220 and prior to step 222, NER improvement system 104 (see FIG. 1) sends the first replacement sentence to translation engine 108 (see FIG. 1), and step 222 includes translation engine 108 (see FIG. 1) employing a machine learning model to determine the first confidence score after translation, where the first confidence score indicates a degree of fluency of the first replacement sentence in a translation algorithm provided by translation 108 (see FIG. 1).

In step 224, NER improvement system 104 (see FIG. 1) generates a second replacement sentence by replacing the candidate sub-entity in the original sentence with a second sub-entity having a type that matches the second candidate type indicated by the second label determined in step 218.

In one embodiment, prior to step 224, NER improvement system 104 (see FIG. 1) retrieves from the corpus stored in data repository 112 (see FIG. 1) second additional sub-entities having other labels indicating another type that matches the second candidate type referenced in step 224. NER improvement system 104 (see FIG. 1) randomly selects the second sub-entity referenced in step 224 from the retrieved second additional sub-entities. The random selection of the second sub-entity employs the pseudo-random number generator or the hardware random number generator.

In step 226, using the aforementioned translation model, NER improvement system 104 (see FIG. 1) determines a second confidence score for the second replacement sentence. The second confidence score is included in confidence scores 116 (see FIG. 1).

In one embodiment, after step 224 and prior to step 226, NER improvement system 104 (see FIG. 1) sends the second replacement sentence to translation engine 108 (see FIG. 1), and step 226 includes translation engine 108 (see FIG. 1) employing a machine learning model to determine the second confidence score after translation, where the second confidence score indicates a degree of fluency of the second replacement sentence in a translation algorithm provided by translation 108 (see FIG. 1).

In step 228, NER improvement system 104 (see FIG. 1) determines that the first confidence score exceeds the second confidence score by an amount that exceeds a threshold amount. NER improvement system 104 (see FIG. 1) receives the threshold amount prior to step 228.

In step 230, based on the first confidence score exceeding the second confidence score by the amount that exceeds the threshold amount, NER improvement system 104 (see FIG. 1) retrains the neural network by selecting the first candidate type instead of the second candidate type as a type of the candidate sub-entity.

After step 230, the process of FIGS. 2A-2B ends at an end node 232.

In one embodiment, the training process of nested NER model 106 (see FIG. 1) includes the use of replacement sentences whose sub-entities have the same types as the candidate sub-entity and further includes an introduction of a translation model provided by translation engine 108 (see FIG. 1), which provides confidence verification to constrain the sub-entities generated as candidates (i.e., the nested NER model 106 (see FIG. 1) is self-consistently trained).

In one embodiment, NER improvement system 104 (see FIG. 1) calculates a first penalty coefficient for the first replacement sentence and a second penalty coefficient for the second replacement sentence. NER improvement system 104 (see FIG. 1) calculates the first penalty coefficient by multiplying the reciprocal of the first confidence score by a loss value of the training of the neural network. NER improvement system 104 (see FIG. 1) calculates the second penalty coefficient by multiplying the reciprocal of the second confidence score by the loss value of the training of the neural network. In one embodiment, the neural network is a LSTM neural network and the loss value is the value returned by a LSTM loss function.

NER improvement system 104 (see FIG. 1) determines that the second penalty coefficient is greater than the first penalty coefficient. Based on the second penalty coefficient being greater than the first penalty coefficient, NER improvement system 104 (see FIG. 1) improves an accuracy of a selection of the first candidate type instead of the second candidate type as the type of the candidate sub-entity.

In one embodiment, after nested NER model 106 (see FIG. 1) is trained by the process of FIGS. 2A-2B, (1) NER improvement system 104 (see FIG. 1) receives textual data (i.e., sentences) that needs to be tested, (2), nested NER model 106 (see FIG. 1) analyzes the received textual data and generates candidate result sub-entities and associated predicates, and (3) classifier 110 (see FIG. 1) analyzes the generated candidate result sub-entities and associated predicates and determines final answers (i.e., determines whether a combination of a given candidate result sub-entity and its associated predicate is logical).

In alternate embodiments, "predicate" and "predicates" in the description of FIGS. 2A-2B presented above are replaced with "verb" and "verbs," respectively.

Examples

Figure 3:
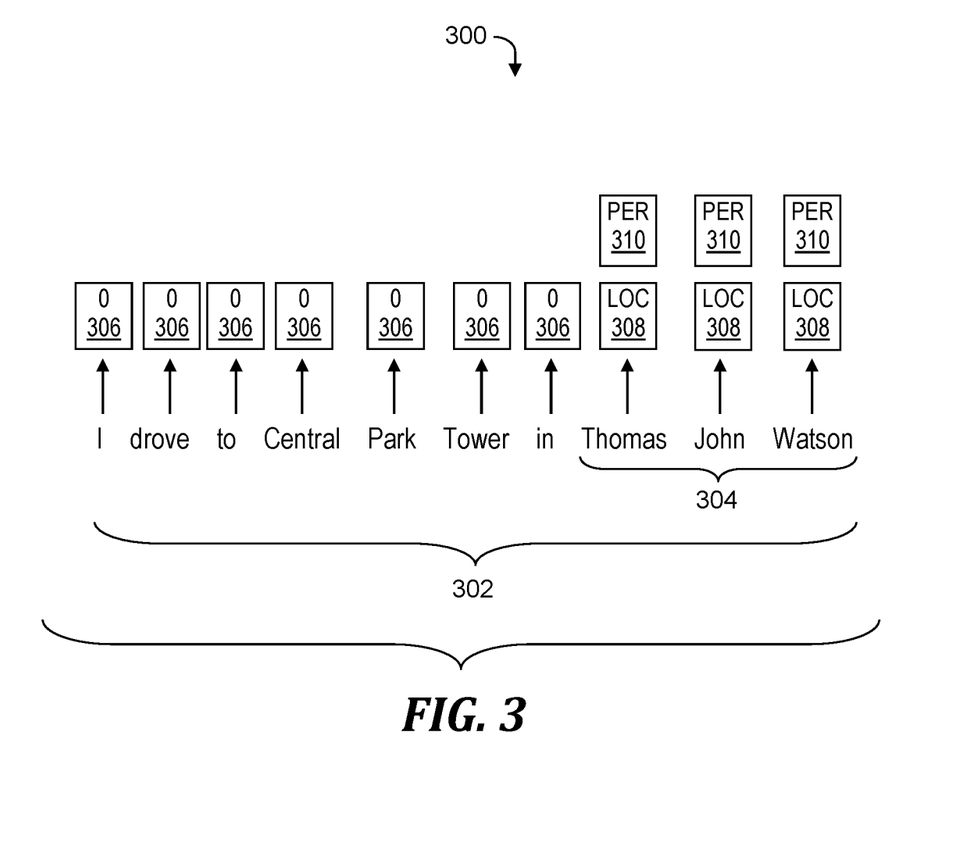
FIG. 3 is an example of multi-label classification being used in the process of FIGS. 2A-2B, in accordance with embodiments of the present invention.

FIG. 3 is an example 300 of multi-label classification being used in the process of FIGS. 2A-2B, in accordance with embodiments of the present invention. Example 300 depicts multi-label classification being employed in the training of nested NER model 106 (see FIG. 1) as described in the process of FIGS. 2A-2B. Example 300 includes a sentence 302 (i.e., "I drove to Central Park Tower in Thomas John Watson"), which includes a nested entity 304 (i.e., "Thomas John Watson"). For each token or word in the sentence 302, one or more associated character bits indicate label(s), which indicates type(s) of sub-entities.

In example 300, the first seven tokens or words in the sentence are labeled with character bit 306 (i.e., character bit "0"). For example, "I" in the sentence is associated with character bit 306.

The purpose of the multi-label classification step depicted in example 300 is to identify nested entities and indicate which sub-entities in the nested entities have multiple labels. In example 300, NER improvement system 104 (see FIG. 1) identifies Thomas John Watson as nested entity 304 and associates Thomas with labels 308 and 310 (i.e., associates Thomas with the labels LOC and PER, which indicate the types location and person, respectively). Similarly, NER improvement system 104 (see FIG. 1) associates John with the location and person types and associates Watson with the location and person types.

Figure 4A:
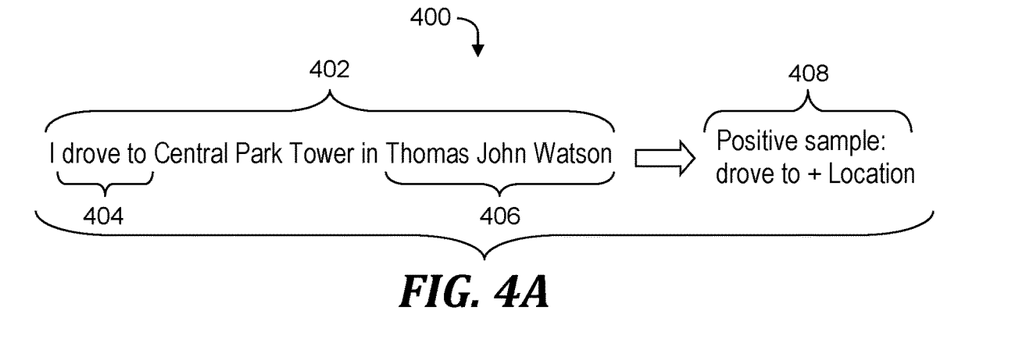
FIG. 4A is an example of forming a positive sample for a training phase in the process of FIGS. 2A-2B, in accordance with embodiments of the present invention.

FIG. 4A is an example 400 of forming a positive sample for a training phase in the process of FIGS. 2A-2B, in accordance with embodiments of the present invention. Example 400 includes a sentence 402 (i.e., "I drove to Central Park Tower in Thomas John Watson"). NER improvement system 104 (see FIG. 1) extracts a predicate 404 (i.e., "drove to") from sentence 402 and uses a candidate sub-entity 406 (i.e., Thomas John Watson) that was provided by the multi-label classification shown in FIG. 3. NER improvement system 104 (see FIG. 1) determines that a combination of the predicate 404 and candidate sub-entity 406 form a positive sample 408 for training data because combining the meaning of "drove to" with a sub-entity that is a location is a logical combination. Positive sample 408 is a combination of "drove to" and the Location type of candidate sub-entity 406).

Figure 4B:
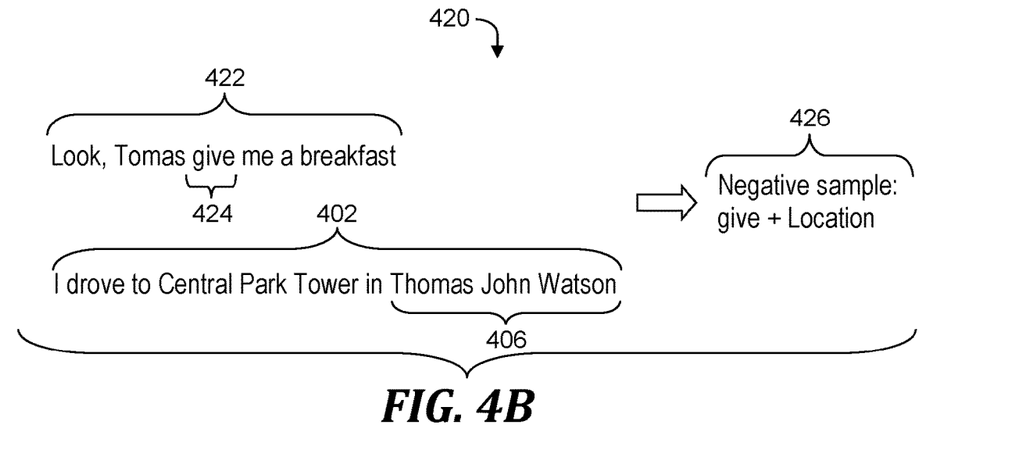
FIG. 4B is an example of forming a negative sample for a training phase in the process of FIGS. 2A-2B, in accordance with embodiments of the present invention.

FIG. 4B is an example 420 of forming a negative sample for a training phase in the process of FIGS. 2A-2B, in accordance with embodiments of the present invention. Example 420 includes a sentence 422 (i.e., "Look, Tomas give me a breakfast"). NER improvement system 104 (see FIG. 1) extracts a predicate 424 (i.e., "give") from sentence 422 and uses a candidate sub-entity 406 (i.e., Thomas John Watson) in sentence 402. NER improvement system 104 (see FIG. 1) determines that a combination of the predicate 424 and candidate sub-entity 406 form a negative sample 426 for training data because combining the meaning of "give" with a sub-entity that is a person is not a logical combination. Negative sample 426 is a combination of "give" and the Location type of candidate sub-entity 406).

Figure 4C:
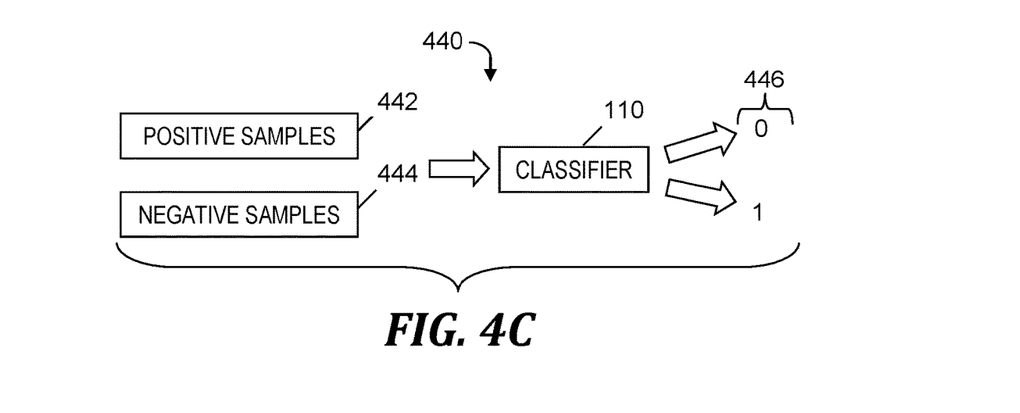
FIG. 4C is an example of constructing a classifier in the process of FIGS. 2A-2B, in accordance with embodiments of the present invention.

FIG. 4C is an example 440 of constructing a classifier 110 in the process of FIGS. 2A-2B, in accordance with embodiments of the present invention. NER improvement system 104 (see FIG. 1) constructs classifier 110 as a decider accepting input that includes a candidate sub-entity and a predicate. Classifier 110 uses positive samples 442 and negative samples 444 (e.g., positive sample 408 in FIG. 4A and negative sample 426 in FIG. 4B) to determine an indicator 446, which indicates whether the combination of the inputted candidate sub-entity and predicate is logical according to the classification result.

Figure 5:
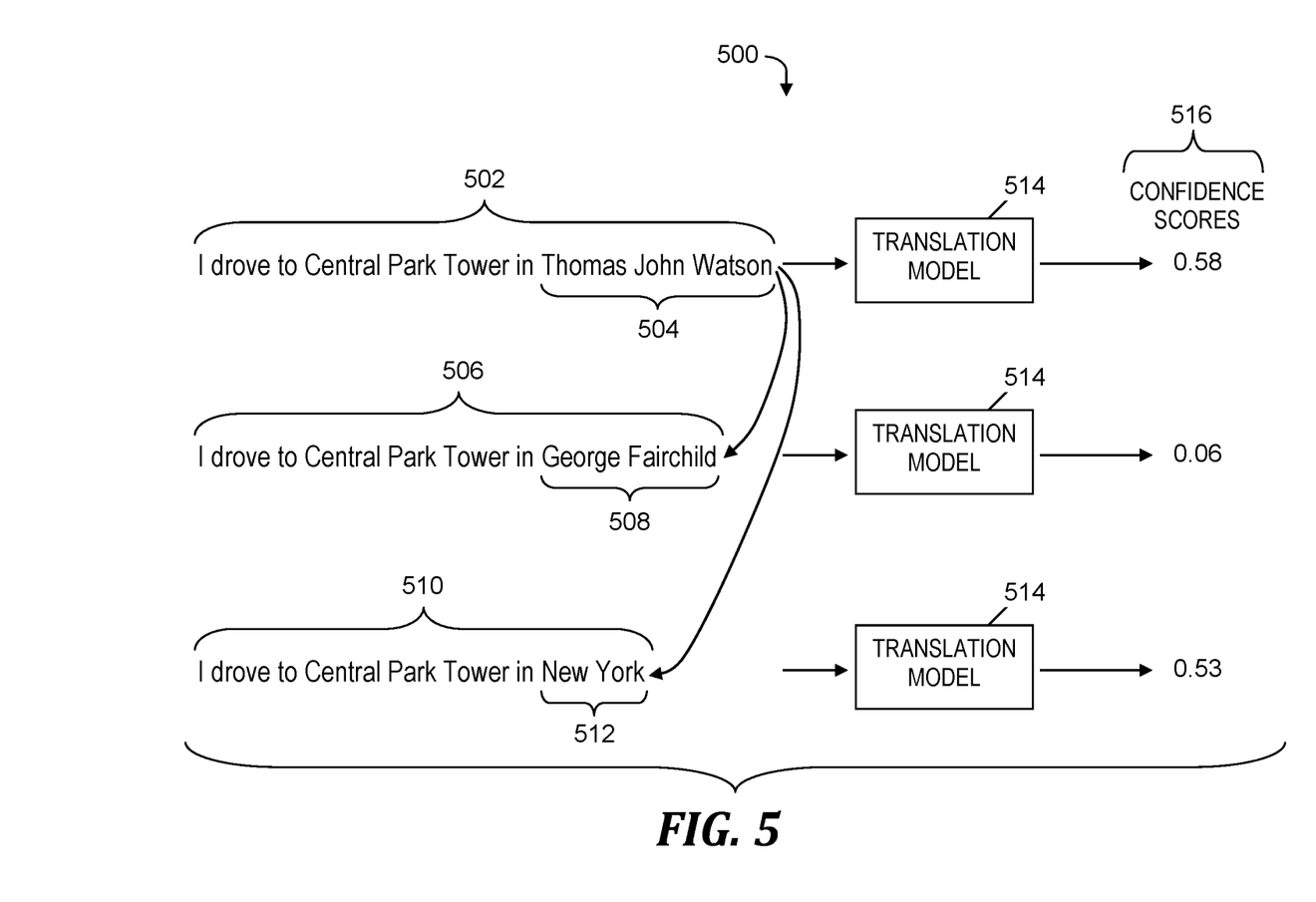
FIG. 5 is an example of determining confidence scores by using replacement sentences in the process of FIGS. 2A-2B, in accordance with embodiments of the present invention.

FIG. 5 is an example 500 of determining confidence scores by using replacement sentences in the process of FIGS. 2A-2B, in accordance with embodiments of the present invention. NER improvement system 104 (see FIG. 1) uses sentence 502 (i.e., I drove to Central Park Tower in Thomas John Watson) and the candidate sub-entity 504 (i.e., Thomas John Watson) identified in step 202 (see FIG. 2A). Sentence 502 is the same as sentence 402 (see FIGS. 4A, 4B, and 4C) and sentence 302 (see FIG. 3) and candidate sub-entity 504 is the same as sub-entity 406 (see FIGS. 4A, 4B, and 4C) and sub-entity 304 (see FIG. 3). Based on the candidate types (i.e., person and location) of the candidate sub-entity 504, NER improvement system 104 (see FIG. 1) finds first sub-entities of a person type and second sub-entities of a location type by searching a corpus stored in data repository 112 (see FIG. 1). NER improvement system 104 (see FIG. 1) forms replacement sentence 506 (i.e., "I drove to Central Park Tower in George Fairchild") by randomly selecting sub-entity 508 (i.e., "George Fairchild") from the first sub-entities having the person type (i.e., selects "George Fairchild") and replacing "Thomas John Watson" in sentence 502 with "George Fairchild."

NER improvement system 104 (see FIG. 1) also forms replacement sentence 510 (i.e., "I drove to Central Park Tower in New York") by randomly selecting sub-entity 512 (i.e., "New York") from the second sub-entities having the location type and replacing "Thomas John Watson" in sentence 502 with "New York."

NER improvement system 104 (see FIG. 1) sends sentence 502, first replacement sentence 506 and second replacement sentence 510 to translation engine 108 (see FIG. 1) which includes translation model 514. Translation engine 108 (see FIG. 1) employs translation model 514 to calculate confidence scores 516 (i.e., calculates 0.58 as the confidence score for sentence 502, 0.06 as the confidence score for first replacement sentence 506, and 0.53 as the confidence score for second replacement sentence 510. NER improvement system 104 (see FIG. 1) uses the confidence scores 516 to retrain the neural network to decrease the loss value of the neural network and obtain greater accuracy in selecting a type of a sub-entity.

Computer System

Figure 6:
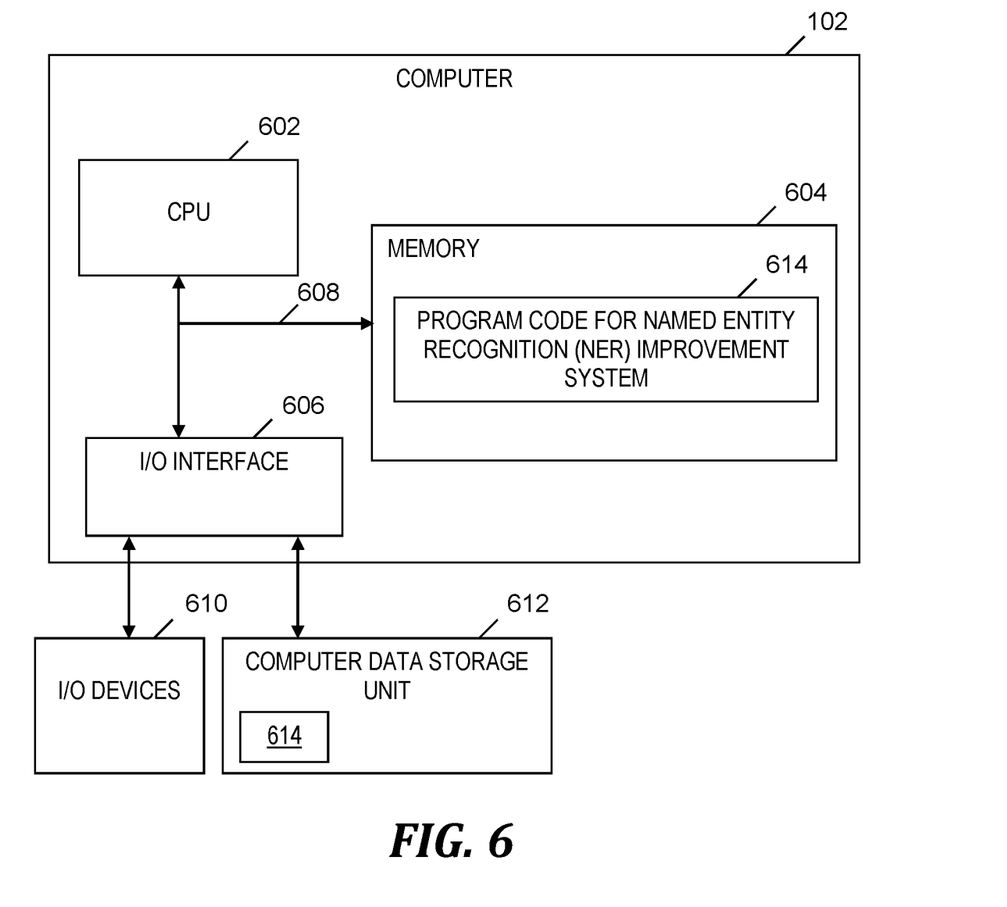
FIG. 6 is a block diagram of a computer that is included in the system of FIG. 1 and that implements the process of FIGS. 2A-2B, in accordance with embodiments of the present invention.

FIG. 6 is a block diagram of a computer that is included in the system of FIG. 1 and that implements the process of FIGS. 2A-2B, in accordance with embodiments of the present invention. Computer 102 is a computer system that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 for NER improvement system 104 (see FIG. 1) to perform a method of improving NER based on multi-task learning and self-consistent verification, where the instructions are executed by CPU 602 via memory 604. CPU 602 may include a single processing unit or processor or be distributed across one or more processing units or one or more processors in one or more locations (e.g., on a client and server).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems or a plurality of computer readable storage media in various forms. Further, memory 604 can include data distributed across, for example, a local area network (LAN) or a wide area network (WAN).

I/O interface 606 includes any system for exchanging information to or from an external source. I/O devices 610 include any known type of external device, including a display, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes one or more known computer readable storage media, where a computer readable storage medium is described below. In one embodiment, computer data storage unit 612 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 604 and/or storage unit 612 may store computer program code 614 that includes instructions that are executed by CPU 602 via memory 604 to improve NER based on multi-task learning and self-consistent verification. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

In one embodiment, computer data storage unit 612 includes data repository 112 (see FIG. 1) and is operatively coupled to NER improvement system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to improving NER based on multi-task learning and self-consistent verification. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to improve NER based on multi-task learning and self-consistent verification. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of improving NER based on multi-task learning and self-consistent verification.

While it is understood that program code 614 for improving NER based on multi-task learning and self-consistent verification may be deployed by manually loading directly in client, server and proxy computers (not shown) via loading a computer-readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider can offer to create, maintain, support, etc. a process of improving NER based on multi-task learning and self-consistent verification. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 604 and computer data storage unit 612) having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
using a multi-label classification in a neural network, identifying, by one or more processors, a candidate sub-entity in an original sentence in a text;
determining, by the one or more processors, first and second labels as indicating first and second candidate types, respectively, of the identified candidate sub-entity, the first and second candidate types being different types;
generating, by the one or more processors, a first replacement sentence by replacing the candidate sub-entity in the original sentence with a first sub-entity having a type that matches the first candidate type;
using a translation model, determining, by the one or more processors, a first confidence score for the first replacement sentence;
generating, by the one or more processors, a second replacement sentence by replacing the candidate sub-entity in the original sentence with a second sub-entity having a type that matches the second candidate type;
using the translation model, determining, by the one or more processors, a second confidence score for the second replacement sentence;
determining, by the one or more processors, that the first confidence score exceeds the second confidence score by a first amount that exceeds a threshold amount;
based on the first confidence score exceeding the second confidence score by the first amount that exceeds the threshold amount, retraining, by the one or more processors, the neural network by selecting the first candidate type instead of the second candidate type as a type of the candidate sub-entity;
calculating, by the one or more processors, first and second penalty coefficients for the first replacement sentence and the second replacement sentence, respectively, wherein the first penalty coefficient is equal to a reciprocal of the first confidence score multiplied by a loss value of the original sentence, and wherein the second penalty coefficient is equal to a reciprocal of the second confidence score multiplied by the loss value of the original sentence;
determining, by the one or more processors, that the second penalty coefficient is greater than the first penalty coefficient; and
based on the second penalty coefficient being greater than the first penalty coefficient, improving, by the one or more processors, an accuracy of a selection of the first candidate type instead of the second candidate type as the type of the candidate sub-entity.

2. The method of claim 1, further comprising:
in a training phase of a named entity recognition (NER) algorithm in the neural network and using the multi-label classification in the neural network, identifying, by one or more processors, first candidate sub-entities in respective original sentences in one or more texts;
in the training phase, extracting, by the one or more processors, first predicates in the original sentences, the first predicates being associated with the first candidate sub-entities in a one-to-one correspondence;
in the training phase, forming, by the one or processors, positive samples of training data by combining the first predicates with first labels indicating respective first types of the associated first candidate sub-entities;
in the training phase, for a given candidate sub-entity in the first candidate sub-entities, selecting, by the one or more processors, other predicates in the original sentences that are associated with other candidate sub-entities other than the given candidate sub-entity in the first candidate sub-entities, the other candidate sub-entities having respective labels indicating respective types that are different from a label indicating a type of the given candidate sub-entity;
in the training phase, forming, by the one or more processors, negative samples of the training data by combining the other predicates with a label indicating a type of the given candidate sub-entity;
constructing, by the one or more processors, a classifier that accepts the positive samples and the negative samples as input; and
using the classifier, determining, by the one or more processors, that a combination of a given candidate sub-entity and a given predicate is logical based on the positive and negative samples.

3. The method of claim 1, further comprising:
retrieving, by the one or more processors, and from a corpus of sub-entities, first additional sub-entities having labels indicating a type that matches the first candidate type;
randomly selecting, by the one or more processors and using a pseudo-random number generator or a hardware random number generator, the first sub-entity from the retrieved first additional sub-entities;
retrieving, by the one or more processors, and from the corpus, second additional sub-entities having other labels indicating another type that matches the second candidate type; and
randomly selecting, by the one or more processors and using the pseudo-random number generator or the hardware random number generator, the second sub-entity from the retrieved second additional sub-entities.

4. The method of claim 1, further comprising:
sending, by the one or more processors, the original sentence and the first and second replacement sentences to a translation engine that employs a machine learning model, wherein the determining the first confidence score and the determining the second confidence score employ the machine learning model.

5. The method of claim 1, wherein the determining the first confidence score includes determining an estimate of a first degree of fluency of the first replacement sentence, and wherein the determining the second confidence score includes determining an estimate of a second degree of fluency of the second replacement sentence.

6. The method of claim 1, further comprising:
providing at least one support service for at least one of creating, integrating, hosting, maintaining, and deploying computer readable program code in the computer, the program code being executed by a processor of the computer to implement steps of identifying the candidate sub-entity, determining the first and second labels, generating the first replacement sentence, determining the first confidence score, generating the second replacement sentence, determining the second confidence score, determining that the first confidence score exceeds the second confidence score by the first amount that exceeds the threshold amount, retraining the neural network by selecting the first candidate type instead of the second candidate type; calculating the first and second penalty coefficients, determining that the second penalty coefficient is greater than the first penalty coefficient, and improving the accuracy of the selection of the first candidate type instead of the second candidate type.

7. A computer program product for improving an accuracy of named entity recognition, the computer program product comprising:
one or more computer readable storage media having computer readable program code collectively stored on the one or more computer readable storage media, the computer readable program code being executed by a central processing unit (CPU) of a computer system to cause the computer system to perform a method comprising:
using a multi-label classification in a neural network, the computer system identifying a candidate sub-entity in an original sentence in a text;
the computer system determining first and second labels as indicating first and second candidate types, respectively, of the identified candidate sub-entity, the first and second candidate types being different types;
the computer system generating a first replacement sentence by replacing the candidate sub-entity in the original sentence with a first sub-entity having a type that matches the first candidate type;
using a translation model, the computer system determining a first confidence score for the first replacement sentence;
the computer system generating a second replacement sentence by replacing the candidate sub-entity in the original sentence with a second sub-entity having a type that matches the second candidate type;
using the translation model, the computer system determining a second confidence score for the second replacement sentence;
the computer system determining that the first confidence score exceeds the second confidence score by a first amount that exceeds a threshold amount;
based on the first confidence score exceeding the second confidence score by the first amount that exceeds the threshold amount, the computer system retraining the neural network by selecting the first candidate type instead of the second candidate type as a type of the candidate sub-entity;
the computer system calculating first and second penalty coefficients for the first replacement sentence and the second replacement sentence, respectively, wherein the first penalty coefficient is equal to a reciprocal of the first confidence score multiplied by a loss value of the original sentence, and wherein the second penalty coefficient is equal to a reciprocal of the second confidence score multiplied by the loss value of the original sentence;

the computer system determining that the second penalty coefficient is greater than the first penalty coefficient; and based on the second penalty coefficient being greater than the first penalty coefficient, the computer system improving an accuracy of a selection of the first candidate type instead of the second candidate type as the type of the candidate sub-entity.

8. The computer program product of claim 7, wherein the method further comprises:

in a training phase of a named entity recognition (NER) algorithm in the neural network and using the multi-label classification in the neural network, the computer system identifying first candidate sub-entities in respective original sentences in one or more texts;

in the training phase, the computer system extracting first predicates in the original sentences, the first predicates being associated with the first candidate sub-entities in a one-to-one correspondence;

in the training phase, the computer system forming positive samples of training data by combining the first predicates with first labels indicating respective first types of the associated first candidate sub-entities;

in the training phase, for a given candidate sub-entity in the first candidate sub-entities, the computer system selecting other predicates in the original sentences that are associated with other candidate sub-entities other than the given candidate sub-entity in the first candidate sub-entities, the other candidate sub-entities having respective labels indicating respective types that are different from a label indicating a type of the given candidate sub-entity;

in the training phase, the computer system forming negative samples of the training data by combining the other predicates with a label indicating a type of the given candidate sub-entity;

the computer system constructing a classifier that accepts the positive samples and the negative samples as input; and using the classifier, the computer system determining that a combination of a given candidate sub-entity and a given predicate is logical based on the positive and negative samples.

9. The computer program product of claim 7, wherein the method further comprises:

the computer system retrieving from a corpus of sub-entities first additional sub-entities having labels indicating a type that matches the first candidate type;

using a pseudo-random number generator or a hardware random number generator, the computer system randomly selecting the first sub-entity from the retrieved first additional sub-entities;

the computer system retrieving from the corpus second additional sub-entities having other labels indicating another type that matches the second candidate type; and using the pseudo-random number generator or the hardware random number generator, the computer system randomly selecting the second sub-entity from the retrieved second additional sub-entities.

10. The computer program product of claim 7, wherein the method further comprises:

the computer system sending the original sentence and the first and second replacement sentences to a translation engine that employs a machine learning model, wherein the determining the first confidence score and the determining the second confidence score employ the machine learning model.

11. The computer program product of claim 7, wherein the determining the first confidence score includes determining an estimate of a first degree of fluency of the first replacement sentence, and wherein the determining the second confidence score includes determining an estimate of a second degree of fluency of the second replacement sentence.

12. A computer system comprising:

a central processing unit (CPU);

a memory coupled to the CPU; and one or more computer readable storage media coupled to the CPU, the one or more computer readable storage media collectively containing instructions that are executed by the CPU via the memory to implement a method of improving an accuracy of named entity recognition, the method comprising:

using a multi-label classification in a neural network, the computer system identifying a candidate sub-entity in an original sentence in a text;

the computer system determining first and second labels as indicating first and second candidate types, respectively, of the identified candidate sub-entity, the first and second candidate types being different types;

the computer system generating a first replacement sentence by replacing the candidate sub-entity in the original sentence with a first sub-entity having a type that matches the first candidate type;

using a translation model, the computer system determining a first confidence score for the first replacement sentence;

the computer system generating a second replacement sentence by replacing the candidate sub-entity in the original sentence with a second sub-entity having a type that matches the second candidate type;

using the translation model, the computer system determining a second confidence score for the second replacement sentence;

the computer system determining that the first confidence score exceeds the second confidence score by a first amount that exceeds a threshold amount;

based on the first confidence score exceeding the second confidence score by the first amount that exceeds the threshold amount, the computer system retraining the neural network by selecting the first candidate type instead of the second candidate type as a type of the candidate sub-entity;

the computer system calculating first and second penalty coefficients for the first replacement sentence and the second replacement sentence, respectively, wherein the first penalty coefficient is equal to a reciprocal of the first confidence score multiplied by a loss value of the original sentence, and wherein the second penalty coefficient is equal to a reciprocal of the second confidence score multiplied by the loss value of the original sentence;

the computer system determining that the second penalty coefficient is greater than the first penalty coefficient; and based on the second penalty coefficient being greater than the first penalty coefficient, the computer system improving an accuracy of a selection of the first candidate type instead of the second candidate type as the type of the candidate sub-entity.

13. The computer system of claim 12, wherein the method further comprises:
- in a training phase of a named entity recognition (NER) algorithm in the neural network and using the multi-label classification in the neural network, the computer system identifying first candidate sub-entities in respective original sentences in one or more texts;
- in the training phase, the computer system extracting first predicates in the original sentences, the first predicates being associated with the first candidate sub-entities in a one-to-one correspondence;
- in the training phase, the computer system forming positive samples of training data by combining the first predicates with first labels indicating respective first types of the associated first candidate sub-entities;
- in the training phase, for a given candidate sub-entity in the first candidate sub-entities, the computer system selecting other predicates in the original sentences that are associated with other candidate sub-entities other than the given candidate sub-entity in the first candidate sub-entities, the other candidate sub-entities having respective labels indicating respective types that are different from a label indicating a type of the given candidate sub-entity;
- in the training phase, the computer system forming negative samples of the training data by combining the other predicates with a label indicating a type of the given candidate sub-entity;
- the computer system constructing a classifier that accepts the positive samples and the negative samples as input; and
- using the classifier, the computer system determining that a combination of a given candidate sub-entity and a given predicate is logical based on the positive and negative samples.

14. The computer system of claim 12, wherein the method further comprises:
- the computer system retrieving from a corpus of sub-entities first additional sub-entities having labels indicating a type that matches the first candidate type;
- using a pseudo-random number generator or a hardware random number generator, the computer system randomly selecting the first sub-entity from the retrieved first additional sub-entities;
- the computer system retrieving from the corpus second additional sub-entities having other labels indicating another type that matches the second candidate type; and
- using the pseudo-random number generator or the hardware random number generator, the computer system randomly selecting the second sub-entity from the retrieved second additional sub-entities.

15. The computer system of claim 12, wherein the method further comprises:
- the computer system sending the original sentence and the first and second replacement sentences to a translation engine that employs a machine learning model, wherein the determining the first confidence score and the determining the second confidence score employ the machine learning model.

16. The computer system of claim 12, wherein the determining the first confidence score includes determining an estimate of a first degree of fluency of the first replacement sentence, and wherein the determining the second confidence score includes determining an estimate of a second degree of fluency of the second replacement sentence.

* * * * *